INVENTOR.
WILLIS E. REXFORD
BY
Blum, Moscovitz, Friedman, Blum & Kaplan
ATTORNEYS INVENTOR.
WILLIS E. REXFORD
BY
Blum, Moscovitz, Friedman, Blum & Kaplan
ATTORNEYS INVENTOR.
WILLIS E. REXFORD
BY
Blum, Moscovitz, Friedman, Blum & Kaplan
ATTORNEYS

INVENTOR.
WILLIS E. REXFORD

BY

Blum, Moscovitz, Friedman, Blum & Kaplan
ATTORNEYS

INVENTOR.
WILLIS E. REXFORD
BY
Blum, Moscovitz, Friedman, Blum & Kaplan
ATTORNEYS INVENTOR
WILLIS E. REXFORD
BY
Blum, Moscovitz, Friedman, Blum & Kaplan
ATTORNEYS United States Patent Office 3,338,369
Patented Aug. 29, 1967

3,338,369

TYPEWRITER KEY OPERATED MECHANISM AND MOUNTING AND GUIDING STRUCTURE THEREFOR

Willis E. Rexford, Girard, Pa., assignor to Louis Marx & Co., Inc.

Filed Oct. 24, 1965, Ser. No. 504,590
15 Claims. (Cl. 197—22)

This invention relates generally to a typewriter and is sore specifically directed to a typewriter having good operating features which may be simply and inexpensively fabricated and assembled for portable and juvenile use. The invention is concerned with providing improved "action" in typewriters of the class described.

Prior typewriters of this general class have generally made substantial sacrifices in performance for the sake of reduced cost and certain marketed machines have operated rather poorly, and key touch or action has generally been well below acceptable standards.

Accordingly, it is an object of this invention to provide a typewriter having good operating characteristics which may be inexpensively fabricated.

Another object of the invention is to provide a typewriter having an improved type bar action with good key "touch."

A further object of the invention is to provide a typewriter constructed of a plurality of inexpensively fabricated elements which may be assembled by relatively unskilled labor.

Still another object of the invention is to provide a typewriter having an improved operating mechanism including improved means for ribbon feed operating in conjunction with an improved universal bar arrangement.

Still other objects and advantages of the invention will in part be obvious and will in part be apparent from the specification.

Generally speaking, in accordance with the invention, a typewriter having a transversely moveable carriage carrying a rotatable platen is mounted rearwardly on a base which carries a molded comb and support element at the keyboard end for support of a plurality of key levers operatively associated with a plurality of slideable or depressable keys. The key levers actuate a type bar and, concurrently, a universal bar which controls carriage escapement as well as ribbon feed. A molded keyboard element provides the pivotal support for the key levers as well as the slide support for the keys, the key levers being arranged for actuating respective type bars through links of identical length.

The invention accordingly comprises the features of construction, combinations of elements, and arrangement of parts which will be exemplified in the construction hereinafter set forth, and the scope of the invention will be indicated in the claims.

For a fuller understanding of the invention, reference is had to the following description taken in connection with the accompanying drawings, in which.

Figures 1, 2:
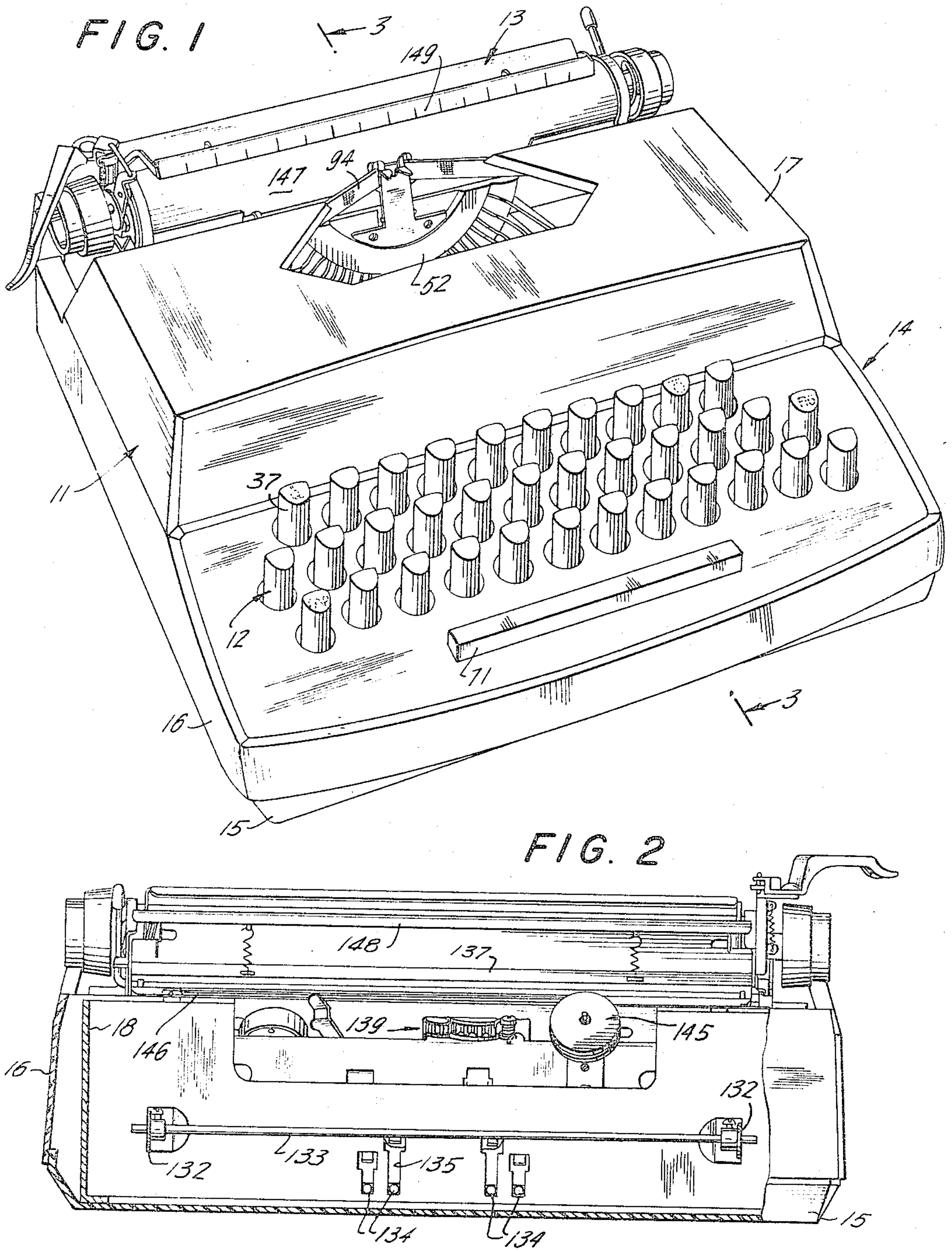
FIG. 1 is an overall perspective view of a typewriter constructed in accordance with the invention.
FIG. 2 is a rear elevational view of the typewriter with portions of the casing broken away to show certain operating elements.

Referring now to the drawings, a typewriter indicated generally at 11 is provided with a conventional keyboard 12 and a carriage 13. Surrounding the operating elements is an attractive, molded plastic casing 14 consisting of a base 15, an envelope body 16 and a cover 17. All operating elements are supported from a pair of side plates 18 which extend along each side of the typewriter from front to back immediately inside the casing. The side plates are preferably formed of stamped sheet metal with casing base 15 being secured to the side plates by any suitable means and the envelope body 16 and cover 17 being secured to the casing base.

*Key lever mechanism*

The key lever mechanism is best seen in FIGS. 3 through 5 and 10. A supporting structure 21 is formed in two sections of molded plastic. An upper comb half 22 is provided with a plurality of planar elements 23 defining a plurality of guide slots 24 therebetween. The lower edge of each planar element 23 is stepped with each step provided with an elongated semicircular cutout 25 for purposes to be hereafter described.

The upper comb half 22 extends forwardly and downwardly to delineate a keyboard portion 26. A plurality of circular apertures 27 are provided in the keyboard portion communicating with depending sleeves 28. One sleeve 28 is provided for each of the typewriter keys with suitable key spacing as best shown in FIG. 1. Note that the typewriter of FIG. 1 is shown as a three bank machine, but a full keyboard, four bank machine could be provided, if desired. Each depending sleeve includes diametrically opposed slots 29 for receiving the keys, described below.

Figure 3:
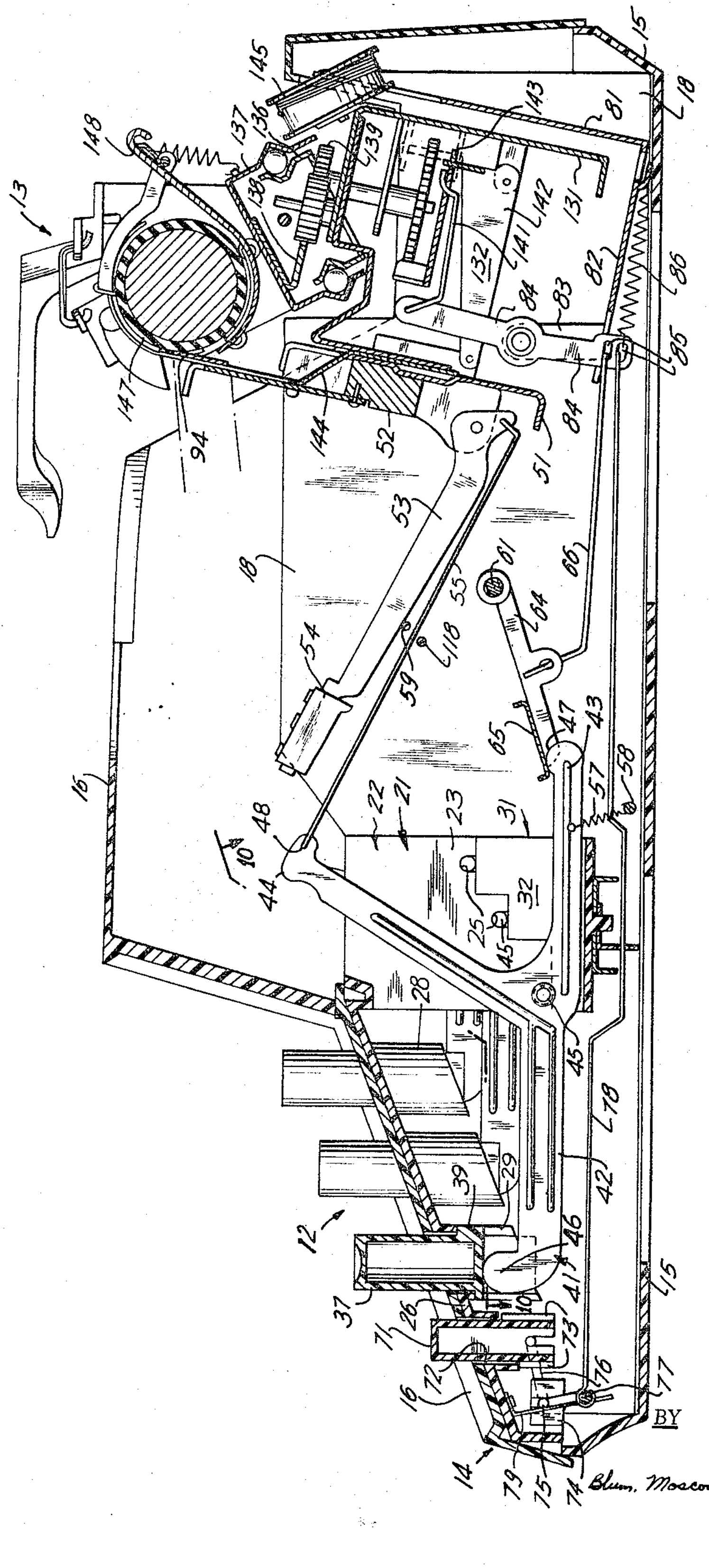
FIG. 3 is a sectional elevational view taken along line 3—3 of FIG. 1.
Figures 4, 5, 5A:
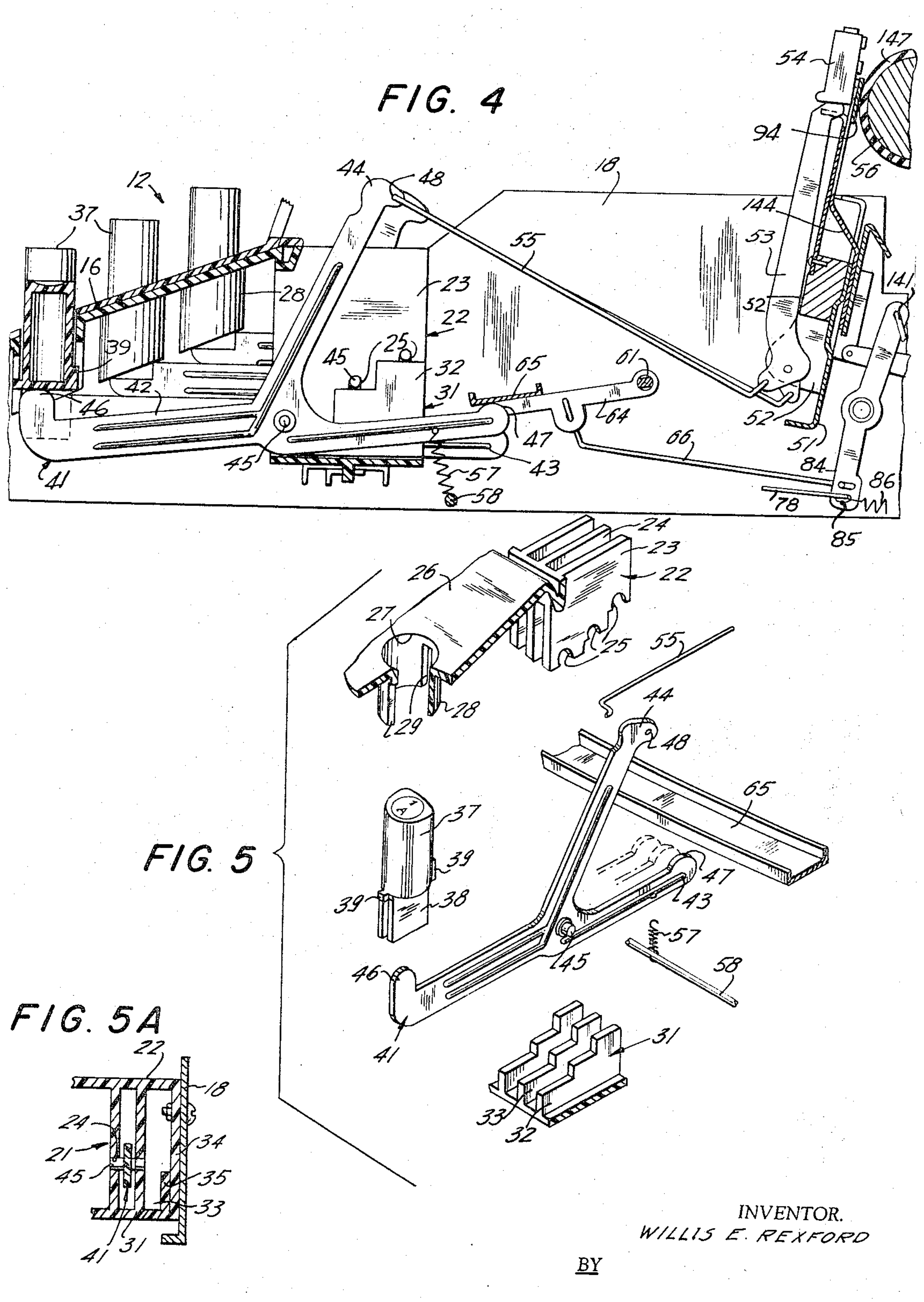
FIG. 4 is a partial view similar to FIG. 3 showing typing elements in operative position.
FIG. 5 is an exploded perspective view of a key lever and associated elements.
FIG. 5A is a partial section view of the key lever supporting structure.

A lower comb half 31 is also preferably molded of a plastic material and includes a plurality of upstanding planar elements 32 defining therebetween a plurality of guide slots 33. The upper surfaces of planar elements 32 are also stepped and are adapted to mate, in abutting relationship, with the stepped portions of planar elements 23 as shown in FIGS. 3, 4 and 5A. As best seen in FIG. 5A, each of the side ends of supporting structure 21 are suitably secured to the respective side plate 18 with upper comb half 22 provided with a depending flange 34 overlying and secured to an upstanding flange 35 formed integrally with lower comb half 31. The flanges and the planar elements may be secured together by any suitable means, such as cement. With the stepped portions of the planar elements in abutting relationship, cutouts 25 define bearing supports for the key levers to be hereafter described.

The keyboard includes a plurality of keys 37 preferably molded of a plastic material with a cylindrical upper portion and a bifurcated lower portion 38. A pair of diametrically opposed ears 39 project from key 37 with each key adapted to project upwardly through keyboard portion 26 when slideably received in sleeve 28. Ears 39 cooperate with slots 29 for guiding of the keys in the sleeves.

Each key cooperates with a key lever 41 also preferably molded of a plastic material. Key lever 41 is in the form of a three armed crank with a key arm 42 extending forwardly from the intersection, a universal arm 43 extending rearwardly from the intersection and a type bar arm 44 extending upwardly and rearwardly from the intersection. Extending transversely of key lever 41 at the intersection are pivot pins 45 which extend in opposite directions and pivotally mount the key lever in a respective pair of bearings defined by cutouts 25 with the key lever being guided in guide slots 24 and 33 which, together, form the guide comb. The outer end of key arm 42 includes an upwardly projecting bearing portion 46 received in bifurcated lower portion 38 of the key, whereby the key lever may be rotated about pivot pins 45 by depression of key 37. The outer end of universal arm 43 is provided with a cam portion 47 for operation of the universal bar to be hereafter described, and the outer end of guide bar arm 44 is provided with an aperture 48 for actuation of the type bar as will hereafter become apparent.

It should be noted that all key lever elements are constructed and operate in an identical manner. However, since keys are provided in three banks, the configuration of the key levers for the respective banks are designed to compensate for unequal key dip, which would occur if the keys were rotated on a common pivot. Thus, for a three bank typewriter, three different key levers are provided, with the key levers for the lowermost bank of keys being configured so that pivot pins 45 pivot in cutouts 25 nearest the front of the typewriter, as shown in FIG. 4. Likewise, the key levers for the middle bank are pivoted in the middle cutouts and the key levers for the uppermost bank are appropriately pivoted in the upper cutouts. The three pivot levels are clearly shown in FIGS. 3 and 4.

As heretofore stated, side plates 18 interconnect and support all the operating elements of the typewriter. A transverse plate 51 suitably secured between side plates 18 and has mounted thereon a type bar segment 52 of arcurate configuration, having pivoted thereto along the periphery a plurality of type bars 53. The outer end of each type bar carries a type lug 54 cast with suitable indicia.

A wire link 55 is eccentrically pivoted to each type bar 53 and connected through aperture 48 to a respective one of the type bar arms 44. The rest position of the type bar mechanism is shown in FIG. 3 and, on depression of any key 37, its associated key lever 41 is rotated in a counterclockwise direction to actuate, through link 55, the associated type bar, whereupon the type lug is moved into striking contact with a platen 56 as shown in FIG. 4. A spring 57 connected between each of the universal arms 43 and a rod 58, supported at opposite ends by side plates 18, bias the key levers, keys, and type bars to the rest, FIG. 3, position. A support rod 59 extends between horizontal plate portions 91 (to be subsequently described) to support the type bars in the rest position.

Figure 10:
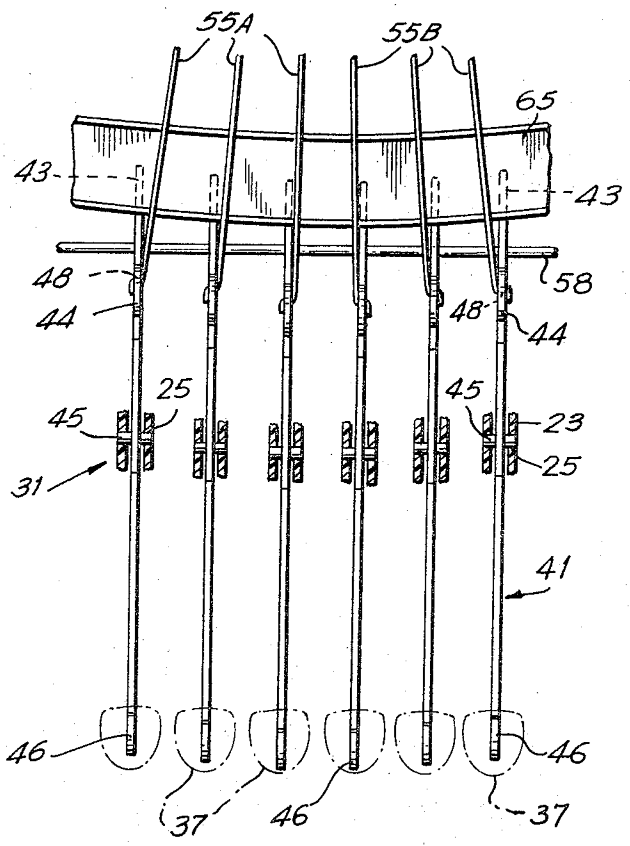
FIG. 10 is a partial sectional view taken along line 10—10 of FIG. 3.

An important feature of the invention may now be described. Type bar segment 52 is located centrally of the typewriter between side plates 18 and pivotally supports the plurality of type bars 53 along an arc of relatively small radius. The key levers 41, on the other hand, are pivoted at three levels (for a three bank machine) along substantially transverse axes. Due to the geometry, this would normally place each aperture 48 in a type arm 44 at a different distance from the type bar segment 52 than the aperture in the adjacent type bar arm. This would require a different length wire link 55 for each type bar connection. This is avoided as best shown in FIG. 10. Bearing cutouts 25 at each level (bank) in adjacent planar elements 23 are arcuately arranged so that those further from the center of the machine are closer to the rear of the machine to compensate for the geometry of the pivots in the type bar segment. In this manner, the pivot aperture 48 in each type bar arm 44 is equally spaced from the pivot of its associated type bar 53. This provides ease of assembly in that all wire links 55 are the same length and only two types need be provided, viz left hand links 55A and right hand links 55B.

Of course, keys 37 in each bank are mounted in alignment and thus the contact point of bearing portion 46 with key 37 will vary from key to key. The contact surface of each key is sufficiently long to provide full contact. With the foregoing construction, the number of different parts is minimized. All keys are identical, the key levers in each bank are identical, all type bars are identical, and all left and right hand wire links are identical.

*Universal Bar*

A pivot rod 61 is supported transversely of the typewriter by means of plate 62 (FIG. 7) supported from the side plates. A pair of spaced arms 63 are mounted fast on pivot rod 61. An additional arm 64 intermediate arms 63 also is mounted fast on pivot rod 61. Arms 63 and 64 are secured to the undersurface of a channel shaped curved universal bar 65 which extends longitudinally of the typewriter directly above and in contact with cam portion 47 of each key lever. On actuation of a key, which effects rotation of its associated key lever, cam portion 47 in contact with the universal bar rotates the universal bar and pivot rod 61 in a clockwise direction and also actuates, through a wire link 66, connected to arm 64, the escapement to be hereafter described.

The channel shaped universal bar is curved for reasons best shown in FIG. 10. As heretofore described, the pivots of each bank of key levers lie along an arc to maximize the number of interchangeable components. Since the key levers in each bank are identical, cam portions 47 thereof lie along an arc which is included by the curved universal bar to assure full engagement between all cam portions and the universal bar.

*Space bar mechanism*

Referring to FIGS. 1 and 3, a space bar 71 in the form of a molded elongated rectangular element, is slideably received in a suitable walled aperture 72 in keyboard portion 26. Ears 73 projecting outwardly from the space bar limit the upward movement thereof. A pair of spaced blocks 74 are molded integrally with the keyboard portion and pivotally support an actuating rod 75 having bend ends 76 cooperating with space bar 71 and a bent central portion 77 encircled by a wire link 78. A leaf spring 79 is secured to the keyboard portion and engages the bent central portion 77 to urge the space bar to the raised position. A rear plate, 81, extends transversely of the typewriter between side plates 18 and is formed with a forwardly projecting L-shaped portion 82 with an upwardly bent plate portion 83. An escapement actuating arm 84 is pivoted to plate portion 83, with the lower portion of escapement actuating arm 84 being provided with a pair of elongated slots 85 which receive links 66 and 78. A spring 86 acting between the escapement actuating arm and rear plate 81 biases the escapement actuating arm in a counterclockwise direction. On actuation of any of the key levers and resultant actuation of universal bar 65, link 66 effects a clockwise rotation of escapement actuating arm 84. Also, on depression of space bar 71, actuating rod 75 is rotated in a clockwise direction, thereby, through wire link 78, also effecting rotation of the escapement actuating arm in a clockwise direction against the action of spring 86.

*Ribbon feed mechanism*

The ribbon feed mechanism is operated in response to actuation of the universal bar and is best shown in FIGS. 6 through 9. Identical mechanisms are provided for rotation of each ribbon spool and thus one only need be described.

Plate 62 secured to side plate 18 is formed with an L-shaped horizontal plate portion 91 to which is secured an upstanding post 92 adapted to rotatably receive thereon a spool 93 wound with typewriter ribbon 94 of any known type. Pivotally mounted on post 92, in contact with the upper surface of plate 91, is a reversing plate 95 having a cam-shaped projection 96, a handle portion 97, V-shaped detent slots 98 and 98A, and an operating ear 99. Rotatably mounted on post 92 in contact with reversing plate 95, is a gear wheel 101 having ratchet teeth 102 around the periphery thereof. Gear wheel 101 is preferably molded of plastic material and includes an upstanding drive pin 103 adapted to be inserted in a suitable aperture in spool 93 to effect rotation of the spool on rotation of the gear wheel. As heretofore stated, plate 62 has rotatably mounted thereto a pivot rod 61 on which is mounted fast an arm 63 carrying the universal bar. Arm 63 has a crank portion 104 carrying a pivot pin 105 at the outer end of the crank portion. A thin spring-like metal plate 106 is pivoted at one end on pivot pin 105 and extends upwardly with its upper end proximate the periphery of ratchet teeth 102 and cam shaped projection 96. An arm 107 depending from plate portion 91 has fixed thereto a pivot pin 108 with an aperture 109 through plate 106 intermediate the ends thereof receiving pivot pin 108 to rotatably mount plate 106 on the pivot pin. Pivot pin 108 has a headed end 111 to retain a spring 112 acting against plate 106 to urge the upper end of the plate toward the gear wheel.

Figure 6:
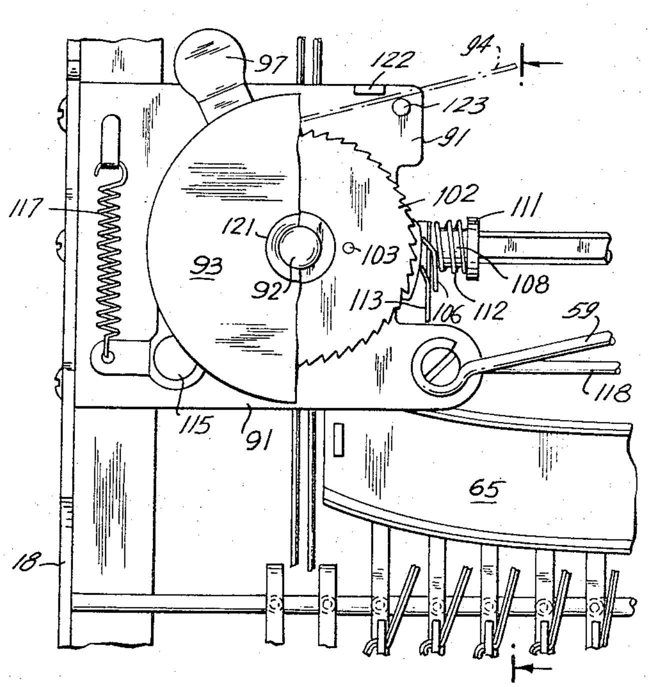
FIG. 6 is a partial plan view, with portions broken away, of the ribbon feed mechanism.
Figure 8:
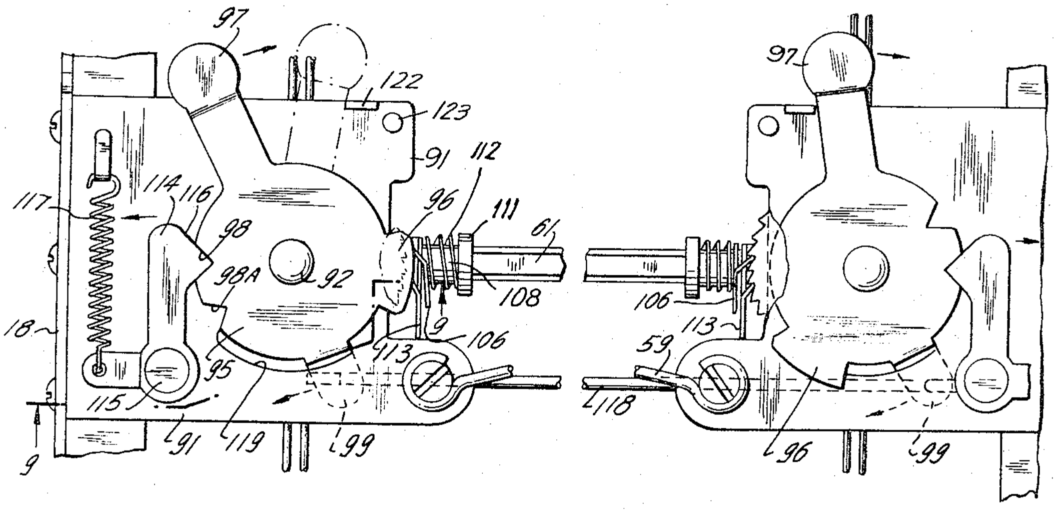
FIG. 8 is a partial plan view of the ribbon feed mechanism with the ribbon removed for the sake of clarity.

A second thin spring-like metal plate 113 is secured at one end against arm 107 by means of pivot pin 108 so as to prevent rotation of second plate 113. The upper end of plate 113 is also proximate ratchet teeth 102 and cammed projection 96. As shown in FIGS. 6 and 8, plates 106 and 113 are bent inwardly toward gear wheel 101 and spring 112 urges the bent portions into contact with ratchet teeth 102.

A detent plate 114 overlies the upper surface of horizontal plate portion 91 and is pivoted thereto as at 115. Detent plate 114 is in the form of a bell crank having a V-shaped end 116 adapted to engage one of the V-shaped detent slots 98 and 98A. The other end of the detent plate is spring biased by means of a spring 117 having an end secured to plate portion 91 so as to urge the V-shaped end toward the detent slots.

Figure 9:
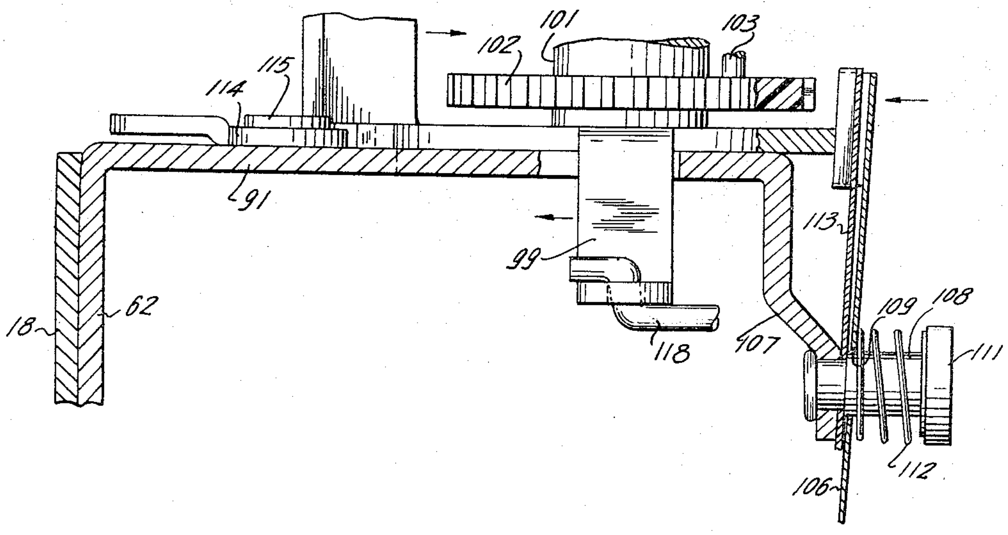
FIG. 9 is a partial sectional view taken along line 9—9 of FIG. 8.

As best seen in FIG. 9, operating ear 99 projects through and below horizontal plate portion 91 and is provided with a suitable aperture for receiving a control link 118. Link 118 extends transversely of the typewriter and connects together the two reversing plates 95.

Figure 7:
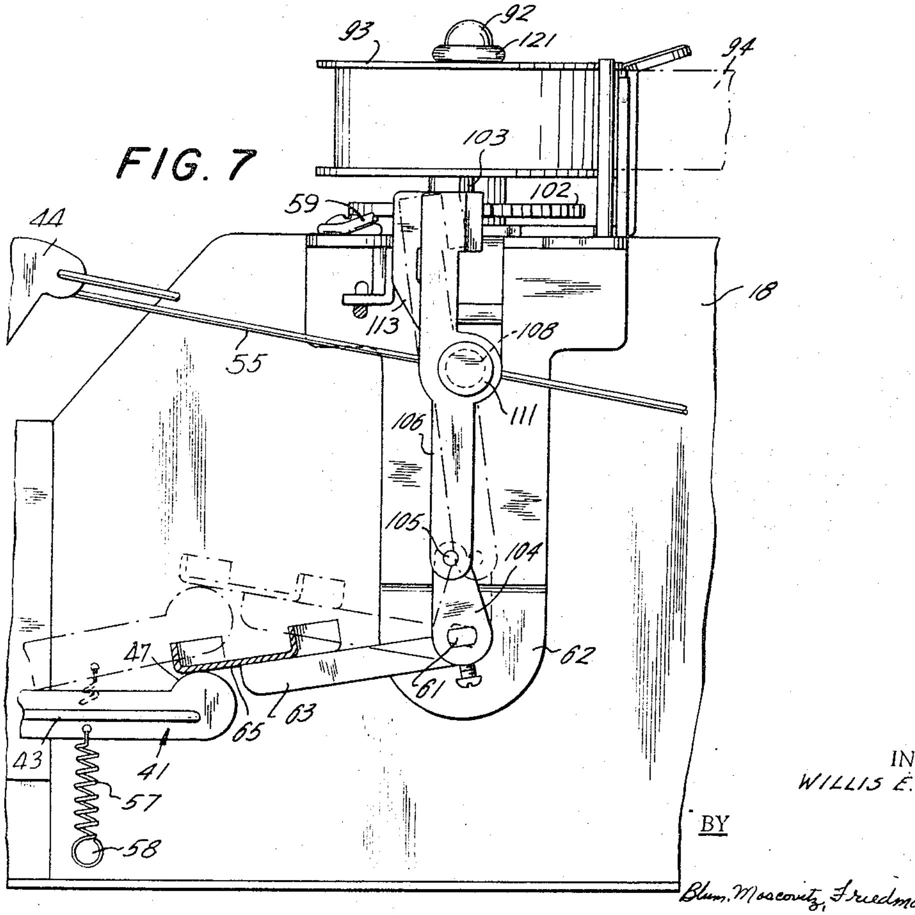
FIG. 7 is a partial elevational view looking in the direction of the arrow in FIG. 6.

The operation of the ribbon feed mechanism will now become apparent. At any point in time, only one spool 93 will be rotated to wind the ribbon thereon, the other spool being freely rotatable to permit the ribbon to be unwound therefrom. This is effected by means of reversing plates 95. As shown in FIG. 8, the left hand reversing plate is held by detent 114 in a position wherein cam shaped projection 96 is in contact with the upper ends of plates 106 and 113 to cam the plates away from ratchet teeth 102 to a non-operating position. Thus, gear wheel 101 carrying a spool may freely rotate. The right hand reversing plate is in an opposite mode wherein cam shaped projection 96 is out of contact with the upper ends of plates 106 and 113, thereby permitting the bent ends of the plates to move into engagement with ratchet teeth 102. Conrol link 118 assures that the two reversing plates operate in unison and thus, when handle portion 97 is moved to the phantom position shown in FIG. 8, cam plate 96 moves out of contact with plates 106 and 113 to permit these plates to engage ratchet teeth 102 and, at the same time, the cam shaped projection 96 on the right hand side of the machine moves into engagement with the respective plates 106 and 113 to then permit gear wheel 101 and the spool mounted thereon to freely rotate. Due to the V-shaped detent slots 98 and 98A and V-shaped ends 116, the reversing plates remain in a set position but may be freely rotated by manual operation of either of handle portions 97. Suitable slots 119 in each of the horizontal plates 91 through which operating ears 99 project, limit the arcuate movement of the reversing plates. As shown in FIG. 7, spool 93 is removably mounted on post 92 and may be releasably secured thereon by any suitable means such as O ring 121.

With the ribbon feed mechanism in the position shown in FIG. 8, fixed second plate 113 acts as a check pawl in engagement with one of the ratchet teeth 102. Plate 106 acts as a moveable pawl with its upper end also in engagement with one of ratchet teeth 102. Referring to FIG. 7, the normal rest position of the elements is shown in full lines. Whenever a key is depressed, key lever 41 is rotated in a counterclockwise direction, thereby rotating universal bar 65, arms 63 and 64, pivot rod 61 and crank portion 104 in a clockwise direction. Through pivot pin 105, moveable pawl 106 is rotated in a counterclockwise direction about pivot pin 108, thereby moving the moveable pawl out of engagement with one of the ratchet teeth and into engagement with the next ratchet tooth closer to fixed pawl 113, as viewed in FIG. 8. When the key lever and universal bar return to the rest position, moveable pawl 106 also returns to the rest position, thereby effecting clockwise rotation of the right hand spool by a distance equal to one tooth. In this manner, a ribbon feed operation occurs each time a key is operated and, when the end of the spool is reached, ribbon reverse is manually effected through handle portion 97, whereupon the pawl and ratchet mechanism on the right hand side of the machine is deactivated and the mechanism on the left hand side of the machine is activated. Note that both moveable pawls 106 are actuated with each actuation of the universal bar but, at any instant of time, one of the moveable pawls is rendered ineffective by means of cam-shaped projection 96.

For guiding of ribbon 94, each plate 91 is provided with an upstanding elongated ear 122 and an upstanding post 123 with ribbon 94 passing therebetween as shown in FIG. 6.

*Carriage and escapement mechanism*

The carriage and escapement mechanism may be of any known, conventional construction and are illustrated merely for the sake of completeness. Referring again to FIGS. 1 through 3, a carriage support bracket 131 extends transversely of the typewriter between rear plate 81 and transverse plate 51. Suitable arms 132 pivot the carriage support bracket on a transverse rod 133, rotatably mounted on rear plate 81 and additional arms (not shown) also pivotally support the carriage support bracket with respect to transverse plate 51, whereby the carriage support bracket is mounted for substantially vertical movement between transverse plate 51 and rear plate 81. Suitable lifter rods 134 are pivotally mounted in a manner not shown to L-shaped portion 82, with the rods being provided with upstanding portions connected by means of links (not shown) to key levers operated in response to depression of associated keys. Lifter rods 134 act on carriage support bracket 131 to perform a shifting operation and the associated key levers would not be provided with universal arms to avoid actuation of the universal bar during the shifting operation. Ends of lifter rods 134 extend through appropriate slots 135 in the rear plate, to limit the amount of carriage shift. One embodiment is provided with two pair of lifter rods, so that shifting may be accomplished from either side of the keyboard with the different rods in each pair permitting the carriage support bracket to be shifted by a different amount, to thereby provide a double shift. Double shift is utilized when type lug 54 is provided with three indicia elements in order to provide sufficient characters in a three bank typewriter for capital and lower-case letters, numerals, and symbols.

Carriage support bracket 131 carries a carriage support channel 136 which cooperatively slideably receives a mating carriage channel 137. A toothed rack 138 depends from carriage channel 137 in engagement with a gear wheel escapement mechanism indicated generally at 139. Escapement mechanism 139 is operated by a link 141 connected to escapement actuating arm 84. An arm 142 pivoted to carriage support bracket 131 cooperates with an escapement release pawl 143 forming part of the escapement mechanism, to actuate a ribbon vibrator 144 to raise the ribbon threaded therethrough into operative position with respect to the type lug each time the escapement mechanism is actuated.

Carriage channel 137 is biased to the right as shown in FIG. 2 by means of a spring pulley 145 mounted on carriage support bracket 131 and a pullstring 146 connected to the carriage channel.

Also mounted on the carriage channel is the usual platen 147, paper guide 148, paper bale 149, etc. Carriage 13 is generally conventional, and a detailed description thereof is deemed unnecessary.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A key lever mechanism comprising a supporting structure including a keyboard section and a comb section rearwardly of said keyboard section, said comb section including a plurality of planar elements defining a plurality of guide slots therebetween, and aligned bearing means in each adjacent pair of planar elements, said keyboard section including key supporting means, a plurality of keys, one moveably mounted in each of said key supporting means, a plurality of key levers, and means on each of said key levers cooperating with an aligned pair of bearing means, said key levers being pivotally mounted on said planar elements by the cooperation of the cooperating means on the key levers and said aligned bearing means, said planar elements being parallel to said key levers, a portion of each key lever being in operative engagement with one of said keys.

2. The structure defined in claim 1 and further including a type bar segment, a plurality of type bars pivoted to said segment, and a link interconnecting each one of said key levers to a respective one of said type bars, said bearing means lying along an arc in a horizontal plane, all said links being of identical length.

3. The structure defined in claim 1, wherein each of said key levers includes a key arm, a universal arm, a type bar arm, and a pair of coaxial pivot pins forming the bearing cooperating means, said key lever arms being substantially coplanar, said pivot pins projecting transversely of said coplanar arms, said key arms extending toward said keyboard section, with a portion of each of said key arms adapted for engagement with a cooperating one of said keys.

4. The structure defined in claim 1, wherein each of said key levers includes a key arm, a universal arm, a type bar arm, and a pair of coaxial pivot pins forming the bearing cooperating means, said key lever arms intersecting and being substantially coplanar, said pivot pins projecting transversely of said coplanar arms substantially at the intersection thereof, said key arms extending toward said keyboard section, with a portion of each of said key arms adapted for engagement with a cooperating one of said keys.

5. The structure defined in claim 10 wherein said bearing means comprises a pair of aligned bearing cutouts in each adjacent pair of planar elements and said means on each of said key levers comprises oppositely projecting coaxial pins received in said bearing cutouts.

6. The structure defined in claim 5, wherein each of said planar elements is provided with at least two bearing cutouts spaced from front to rear and vertically with respect to one another whereby the axial pins from two key levers guided in guide slots on opposite sides of a planar element are received in individual bearing cutouts.

7. The structure defined in claim 5 wherein the center points between at least some of said pairs of aligned bearing cutouts lie in a horizontal plane and define an arc in said plane.

8. The structure defined in claim 1, wherein said comb section is formed in two pieces with an upper half and a lower half secured together in abutting relationship, the abutting surfaces being stepped from front to rear and vertically, to form a plurality of steps equal in number to the number of rows of keys in the typewriter, at least some of said steps being provided with bearing cutouts to form bearing means for support of said key levers when said upper and lower sections are secured in abutting relationship.

9. The structure defined in claim 1 wherein said key supporting means comprises a plurality of depending sleeves, each of said keys being slideably mounted in a respective one of said depending sleeves.

10. The structure defined in claim 9, wherein each of said depending sleeves has the general configuration of a tube and is provided with opposed longitudinal guide slots, each of said keys including a pair of opposed, outwardly projecting ears adapted to be received in said guide slots for guiding said keys during sliding movement in said sleeves and for limiting the upward movement thereof.

11. The structure defined in claim 10, wherein said key includes a bifurcated lower end adapted to receive therein a portion of a cooperating one of said key levers for operative engagement therewith.

12. In a typewriter of the class described, the combination comprising a frame having front and rear ends, a supporting structure secured to said frame at the front end, a plurality of keys moveably mounted in said supporting structure, a plurality of key levers pivotally mounted in said supporting structure, a portion of each key lever being in operative engagement with one of said keys and mounted for relative movement with respect thereto, a pivot rod mounted in said frame rearwardly of said supporting structure, at least one operating arm mounted on said pivot rod, and a universal bar carried by said operating arm portion of each key lever being in engagement with said universal bar.

13. The structure defined in claim 12 wherein said frame includes a pair of spaced side plates, said supporting structure being connected between said side plates proximate to the forward portions thereof, said pivot rod being mounted between said side plates, each key lever having at least a key arm cooperating with a key, and a universal arm, said universal bar being in the form of a channel shaped member with the side of the channel opposite the legs thereof adapted for engagement with a portion of each of said universal arms, whereby said operating arm is pivoted on the longitudinal axis of said pivot rod on actuation of any one of said keys.

14. The structure defined in claim 13, wherein at least two operating arms are provided on said pivot rod, said operating arms extending parallel to said side plates toward the front portions thereof, said operating arms supporting said universal bar at opposite ends thereof.

15. In a typewriter of the class described, the combination including a frame, a plurality of keys moveably mounted in said frame, a plurality of type bar levers pivoted to said frame, one key being provided for each of said type bar levers, an escapement mechanism, a universal bar operatively connected to said escapement mechanism, and a plurality of key levers, each of said key levers including a key arm, a universal arm, a type bar arm and pivot means for pivotally supporting said key lever on said frame, said key lever arms intersecting and being coplanar at the intersection thereof and being substantially coplanar at points remote from said intersection, the outer end of said key arm cooperating with an associated one of said keys for actuation of said key lever, the outer end of said type bar arm cooperating with an associated one of said type bar levers for actuating same, and the outer end of said universal arm cooperating with said universal bar for actuation of said universal bar.

References Cited

UNITED STATES PATENTS

| | | | |
|---|---|---|---|
| 1,880,896 | 10/1932 | Doughty | 197—98 X |
| 3,057,449 | 10/1962 | Thomson | 197—22 |
| 3,223,220 | 12/1965 | Rexford | 197—22 |

WILLIAM B. PENN, *Primary Examiner.*

ROBERT E. PULFREY, SAMUEL FEINBERG, *Examiners.*

E. S. BURR, *Assistant Examiner.*

UNITED STATES PATENT OFFICE

CERTIFICATE OF CORRECTION

Patent No. 3,338,369 August 29, 1967

Willis E. Rexford

It is hereby certified that error appears in the above numbered patent requiring correction and that the said Letters Patent should read as corrected below.

Column 7, line 73, for the claim reference numeral "10" read -- 1 --.

Signed and sealed this 4th day of February 1969.

(SEAL)
Attest:

Edward M. Fletcher, Jr.
Attesting Officer

EDWARD J. BRENNER
Commissioner of Patents